June 2, 1964  C. J. HICKMAN  3,135,240
CHUTE GATES
Filed June 20, 1963  2 Sheets-Sheet 1
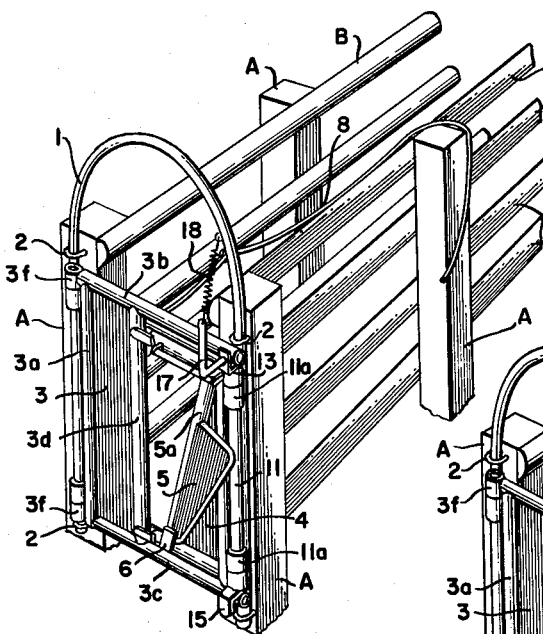
FIG.1.
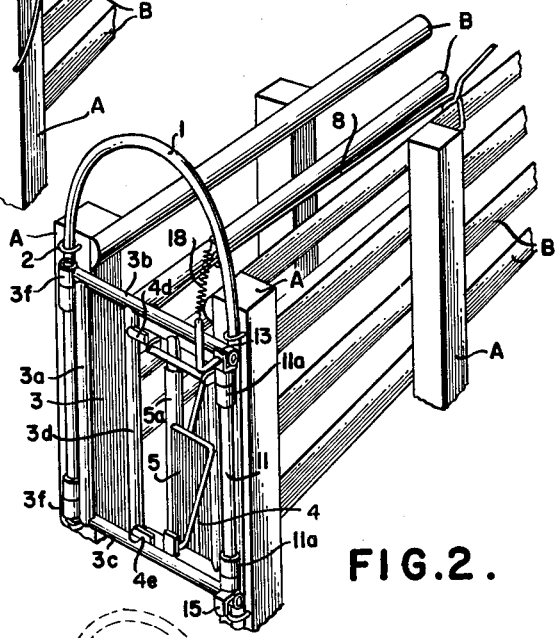
FIG.2.
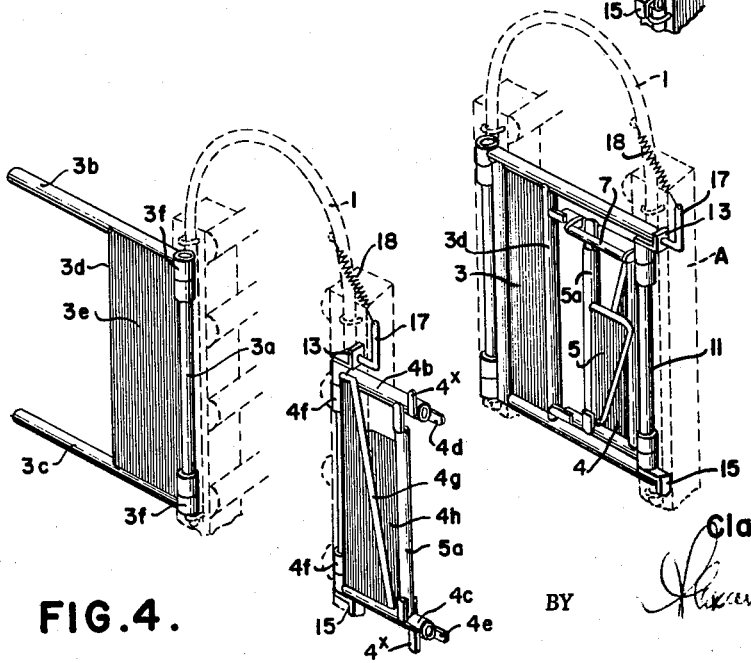
FIG.3.
FIG.4.
INVENTOR
Clarence J. Hickman
BY
ATTORNEY June 2, 1964     C. J. HICKMAN     3,135,240
CHUTE GATES
Filed June 20, 1963                        2 Sheets-Sheet 2
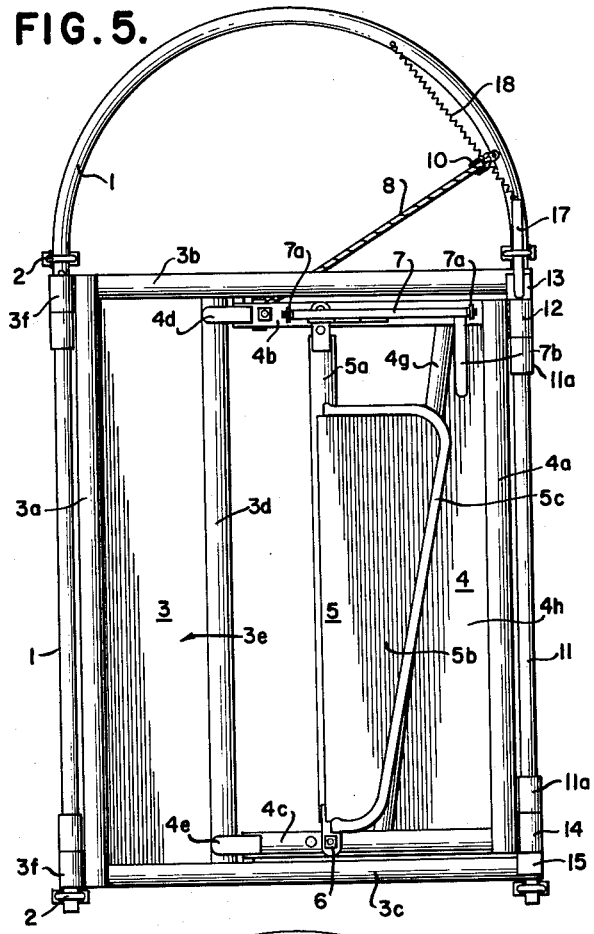
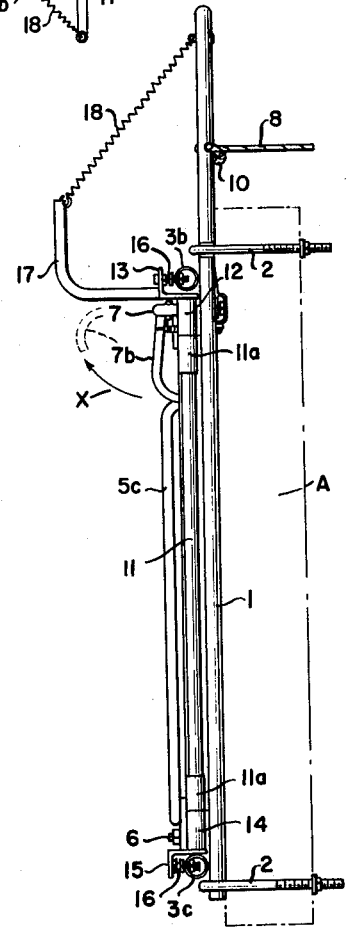
INVENTOR
Clarence J. Hickman
BY
ATTORNEYS : 3,135,240
CHUTE GATES
Clarence J. Hickman, Star Rte., Keota, Colo.
Filed June 20, 1963, Ser. No. 289,313
12 Claims. (Cl. 119—99)

This invention is a novel chute gate for restraining animals in animal chutes or the like for certain operations thereon, designed to prevent injury to the animals and to the attendant, the gate being simple in construction, application, and operation, and designed to prevent operational mistakes, such as the inadvertent release of the animals before the operations thereon have been completed.

The principal object of the invention is to provide a gate for animal chutes adapted to restrain livestock, primarily cattle, for the purposes of (1) breeding; (2) testing for pregnancy and fertility; (3) physiological examination; (4) tattooing, ear marking, tagging and branding for identification; (5) application of veterinary practices, including shots, surgery and medication; and also for other purposes.

Another object of the invention is to provide a chute gate which will permit accomplishment of the purposes above mentioned, and which by experience has been found to be conducive to the accomplishment of the above practices with a minimum of disturbance, excitement, or shock to the animal, this "passive" attitude of the animal being particularly important in handling range cows for artificial breeding to obtain a high conception rate after first service. Range animals are not normally quiet, and I have found that restraint is usually required in order to perform the above operations and practices.

A further object of the invention is to provide a chute gate which by the incorporation of my novel features of design and construction actually prevents most of the physical injuries to animals which are common to the bulk of restraining devices currently in use.

Further objects of the invention are to provide a chute gate of the above type which allows release of the animal instantly, regardless of position or disposition, and in which restraint and release are both accomplished with a minimum of manual movement and sound; also to provide a chute gate in which release is accomplished without first requiring a struggling animal to cooperate by withdrawing her head, backing up, turning to one side, or waiting while a series of noisy catches, levers, nose bars, squeeze panels, etc., are released; also to provide a chute gate which will permit the attendants, technicians and veterinarians to operate quietly and safely; and further to provide a low cost, simple and structurally sound restraining device that can be obtained as a finished, all steel, welded unit for installation in chutes, runways, in small gate openings, in door openings, or wherever restraining devices are required.

More particularly, I have provided a chute gate of width depending upon that of the animal, having a stanchion disposed therein, or at an end thereof, so that the animals may be walked into the chute from the back thereof with one attendant disposed behind the animal, there being no necessity for a second attendant to enter the chute in front of the animal, and thus the animal is maintained in a quiet attitude. Then while the animal is locked in the gate and restrained in the stanchion by her head, she can be operated upon, after which she may be released either out of the front or out of the rear of the chute, whichever we may desire her to do.

I will explain the invention with reference to the accompanying drawings which illustrate one practical embodiment thereof, to enable others to adopt and use the same; and will summarize in the claims, the novel features of construction, and novel combination of parts, for which protection is desired.

In said drawings:

FIG. 1 is a perspective view of an animal chute having my novel gate installed at one end thereof, and showing the gate locked with the stanchion open.

FIG. 2 is a perspective view similar to FIG. 1 showing the gate locked, and the stanchion closed.

FIG. 3 is a view similar to FIGS. 1 and 2 showing the gate released.

FIG. 4 is a view similar to FIG. 3 but showing the gate open.

FIG. 5 is an enlarged elevation of the gate in the position shown in FIG. 2.

FIG. 6 is a side elevation of the parts shown in FIG. 5.

FIG. 7 is a top plan view of the parts shown in FIG. 5.

FIG. 8 is a partial rear elevation of the gate.

As shown in the drawings, my novel chute gate is adapted to be associated with a cattle chute of width somewhat greater than that of the animal to be associated therewith, the chute consisting of pairs of spaced uprights A and horizontal strips B in the usual manner, the particular construction of the chute forming no part of my present invention. My novel chute gate is adapted to be disposed at one end of the chute A—B, or intermediate the ends thereof, as desired.

The chute gate comprises an inverted U-shaped frame 1 preferably formed of pipe bent into the shape shown in FIG. 1, and may be either a single length of pipe or tube or formed in sections as desired. The sides of the frame 1, as shown in FIG. 1, abut the outer faces of the end posts A of the chute and are secured to such posts adjacent the tops and bottoms thereof by U-bolts 2, as shown more particularly in FIG. 6, the U-bolts being of sufficient length that they may be passed through bores in posts A. As shown, the upper U-bolts 2 are disposed adjacent the tops of posts A, while the lower U-bolts 2 are disposed adjacent the bottoms of posts A.

The vertical portions of the post 1 serve as hinge posts for a pair of chute gates which may be swung from closed position shown in FIGS. 1 and 2 into the opened position shown in FIG. 4. One gate 3 consists of a frame formed from welded tubing having one member 3a disposed parallel with and adjacent the leg of frame 1, to the upper end of which is welded a top bar 3b which in one position extends entirely across the chute A—B and overlies the opposite leg of frame 1; also a bottom bar 3c which is welded to bottom bar 3a, disposed parallel with bar 3b, the bar 3c also extending in one position across the chute and overlying the opposite leg of frame 1. Between the bars 3b, 3c is welded a vertical bar 3d disposed somewhat less than midway between the sides of the chute, as shown in FIG. 5, all of the bars 3a, 3b, 3c and 3d being welded together at their meeting ends. The space between the members 3a, 3d is closed by a metallic plate 3e which closes the opening between members 3a and 3d, and 3b and 3c to prevent attempt by the animal to pass her legs or head through said area when the gate is closed. The bar 3a carries at its upper and lower ends annular bearings 3f through which the leg of the frame 1 passes, whereby the gate 3 is hingedly mounted on the frame 1 for swinging action and preferably the bearings 3f are disposed adjacent their respective U-bolts 2 so as to prevent gate 3 from vertical movement on the frame 1.

The opposite gate 4 is journaled on the opposite leg of frame 1 and also consists of pipe or tube sections welded together at their meeting ends to form a substantially rectangular frame. As shown, the gate 4 consists of a pipe 4a similar to member 3a of gate 3, the same having at its upper and lower ends cylindrical bearings 4f similar to bearing 3f receiving the adjacent leg of the frame 1. Gate 4 is provided with an upper bar 4b and a lower bar 4c welded to the bar 4a, each extending inwardly of the chute and terminating slightly in advance of the member 3d of gate 3, the outer ends of the bars 4b, 4c being provided with offset extensions 4d and 4e adapted when the gates are closed, as shown in FIG. 1, to contact the member 3d of gate 3 so that the gates 3 and 4 will be disposed in substantially the same vertical plane. Gate 4 is provided with an inclined inner vertical pipe 4g having its ends welded to the top and bottom bars 4b, 4c. The space between the pipes 4a, 4g and 4b, 4c is covered by a metallic plate 4h to close the opening between said members and to prevent attempt by the animal to pass through said area. All parts of the gate 4 above described are welded or otherwise secured together. When the gates 3—4 are closed, the same will lie in substantially the same vertical plane. Extending upwardly from the outer end of bar 4b and downwardly from the outer end of bar 4c are lugs 4x which engage the rear faces of the bars 3b and 3c of gate 3 when the gates are closed, to prevent opening of gate 4 until gate 3 has been opened. It is of course necessary to first open the gate 4 in order that gate 3 may be released or opened; and it is necessary to first close gate 4 before gate 3 may be closed.

A stanchion gate 5 is pivotally mounted on the gate 4 at its lower end by means of a bolt 6 or the like, said stanchion gate consisting of a vertical pipe 5a pivoted to pipe frame 4c on bolt 6, as shown in FIG. 5, while its upper end of pipe 5a is free to slide laterally on the member 4b of gate 4. Pipe 5a carries a metallic plate 5b which is reinforced on its edges by a pipe 5c shown more particularly in FIG. 5, the plate 5b and pipe 5c being securely welded to the pipe 5a and to each other, the plate 5b being preferably wider at its upper end than at its lower end so as to conform generally with the inclination of the member 4g of gate 4, and to prevent the animals from passing through the opening between the members 4g of gate 4 and 3d of gate 3 when the gates are closed, and the stanchion gate 5 swung into operative position shown in FIG. 2.

As shown in FIGS. 5, 6 and 7, means are provided for locking the stanchion gate 5 into one of several lateral positions with respect to the gate 4. A horizontal shaft 7 is journaled in spaced bearings 7a on the outer face of the pipe 4b of gate 4, the same having a depending handle 7b normally engaging the outer face of the plate 4h of gate 4 and gravitationally hanging in the position shown in FIG. 6. On the inner face of shaft 7 when in normal position are a series of teeth or detents 7c, three being shown in FIG. 7, the same being adapted to cooperate with a fixed spring-biased detent 7d on the top bar 4b of gate 4 so that when the upper end of member 5a of stanchion gate 5 is swung toward the member 3d of gate 3, the teeth or detents 7c will pass in succession beyond the fixed spring-biased detent 7d and prevent the member 5a from being retracted in the opposite direction, thereby adjustably locking the gate 5 into any pivoted position. The use of a plurality of detents 7c allows for variations in thickness of the necks of the animals which are to be held in the gate; and when the upper end of the stanchion gate 5 is swung inwardly towards the member 3d of gate 3 the same will be prevented from retraction in the opposite direction until the detents are released.

While the stanchion 5 may be swung manually from the front or rear of the chute gate the same is preferably operated by a rope 8, FIG. 8, having one end fixed to the upper end of the frame member 5a having a run passing around a pulley 9 fixed on the outer end of member 4b of gate 4 adjacent the upright 3d, the rope 8 then passing upwardly around a pulley 10 which is mounted on the upper arched portion of the frame 1, the rope 8 then passing loosely and rearwardly of the gate along the side of the chute adjacent the gate 4 and having its outer end tied to the chute, whereby when an animal is being moved along the chute towards the gate with an attendant walking behind the animal, the rope 8 will be in a convenient position for a pull thereon by the attendant just as the animal extends its head through the open stanchion gate 5, the pull on the rope 8 swinging the upper end of the stanchion gate 5 toward the gate 3 and the detents 7c, 7d becoming thereby engages to prevent reopening of the stanchion gate 5 until the ratchet teeth or detents 7c are disengaged from the fixed detent 7d.

The ratchet teeth or detents 7c, 7d are released or disengaged merely by an outward pull on the lever 7b of shaft 7 in the direction of the arrow X shown in FIG. 6, the lever again assuming the position shown in FIG. 6 when the grip on the handle is released due to the gravitational weight of the handle 7b.

Means are provided for automatically locking the gates 3 and 4 in closed position shown in FIGS. 1 and 2. As previously stated, the top and bottom members 3b, 3c of gate 3 when in closed position extend across the chute and overlie the leg of frame 1 at the opposite side of the chute, as clearly shown in FIG. 1. In order to prevent the gate 3 from normally swinging open, I provide pivoted stops engaging the outer ends of the members 3b, 3c, the same being mounted upon a vertical swinging rod 11 which is mounted in bearings 11a on the hinge side of the gate 4, the rod 11 extending above and below said bearings 11a and carrying at its upper end a head 12 disposed below the frame member 3b which carries at its upper end an angle clip 13 having its vertical flange extending upwardly in front of the frame member 3b of gate 4. Similarly, at the lower end of rod 11 is a head 14 terminating above the lower member 3c of gate 3, and on head 14 is an angle clip 15 having its vertical flange extending in front of the frame member 3c, as shown more particularly in FIG. 6. Each frame member 3b and 3c carries a bumper 16 on its front face adapted to engage the vertical flange of its related angle clip 13 or 15, as shown in FIG. 6. Rod 11 is rotatable, and the upper angle clip 16 carries a forwardly extending L-shaped handle 17 whereby the shaft 11 may be rotated. When the handle 17 is in the position shown in FIGS. 5, 6 and 7, the angle clips 13 and 15, carried by rod 11, are disposed directly in front of the frame members 3b, 3c of gate 3, and thus the gate member 3 is prevented from swinging open, i.e., into position parallel with the chute. When, however, the handle 17 is rotated counterclockwise into position shown in FIG. 4, the angle clips 13 and 15 will be simultaneously swung in an arc around the ends of the frame members 3b, 3c, permitting the gate 3 to swing into open position shown in FIG. 4, after which the gate 4 may be opened without obstruction of the lugs 4x. A tensile spring 18 having one end secured to the upper end of handle 17 and its other end secured to the frame 1 normally holds the handle into position to maintain the angle clips 13 and 15 opposite the members 3b, 3c of gate 3, and thereby maintain the gates 3 and 4 locked into closed position.

The above construction provides a very simple and efficient means for locking the gates 3 and 4 in closed position and for releasing said gates for opening movement; also provides very simple and efficient means for opening and closing the stanchion gate 5.

In operation, as the attendant moves the animal from the rear of the chute towards the chute gate he would be disposed behind the animal in the chute. Initially he would grasp the rope 8 and with a quick pull thereon close the stanchion gate 5 just as the animal's head passes between the gates. The ratchet arrangement 7d, 7c on the top of the stanchion gate 5 will automatically latch on one of the ratchets 7c in one of three positions and prevent the stanchion from opening, the latch 7d being preferably spring-biased.

The stanchion 5 when engaged with the neck of the animal restrains the animal from moving ahead or backing out, but she is free to raise or lower her head or kneel down, which they frequently do, without releasing herself accidentally.

The webs on the gates 3 and 4 and on the stanchion 5 prevent the animal from thrusting her neck and feet through the gate in such manner as to break bones or interfere with any operational features of the gate.

The entire design of the gate is clean and simple without projections or sharp handles on which the animal or operator alike could become injured, and experience has shown that with my gate a minimum of restraint without injury will in most cases result in a quieter animal with little fear of reentry at a later date.

In order to release the animal the handle 17 is rotated by the operator into the position shown in FIG. 3, thus releasing both the top and bottom legs 3b, 3c of gate 3, and permitting the gates to start swinging open. As gate 3 opens, gate 4 is released and free to swing open. In thus releasing the gates it is not necessary to open the stanchion 5 or to disturb the animal. However, if it is desired to discharge the animal to the rear of the chute it is only necessary to lift the handle 7b, allowing the stanchion gate 5 to open so that the animal can back out. When open, both gates 3 and 4 are positioned to allow unobstructed opening for the animal as she leaves the chute in a forwardly direction.

The U-bolts 2 are made long enough to pass through any thickness of material from which the uprights A would be made, and after installing the frame 1 the excess of the bolts can be cut off. However, by using long U-bolts in cases where the chute gate does not exactly meet the inside dimensions of the chute the bolts can be swiveled in or out to reach the structure if several inches wider or narrower than the chute gate itself.

One feature of my gate is that no operator is required near the gate and no operator required in front of the animal, thereby attempting as far as possible to keep the animal calm and avoid any interference when the animal is entering the gate. In releasing the gate by rotating the lever 17, the gate 3 does not fly open necessarily if the animal is standing quietly, the gate remaining in the position shown until a slight amount of pressure is placed on gate 3. However, if the animal is violent the gates 3 and 4 will open rapidly. If the animal makes no move to leave the chute a slight amount of pressure on gate 3 will start the gate to open, and she eventually walks on out, gate 4 opening widely.

Another feature of my invention is that the gate can be opened flat back as shown in FIG. 4 to allow installation of equipment such as squeeze chutes, loading chutes or any other equipment in front of the runway without the need for taking the gate off the chute.

I do not limit my invention to the exact form shown in the drawings, for obviously changes may be made therein within the scope of the claims.

I claim:

1. In combination with an animal chute, a combined gate and stanchion; said gate comprising a frame having spaced legs disposed transversely of and bridging the sides of the chute; a first gate hingedly mounted on one leg of the frame and having top and bottom horizontal bars of such length that when the gate is swung into closed position transversely of the chute the outer ends of the bars will engage the opposite leg of the frame; said first gate being adapted to close less than half the width of the chute; a second gate hingedly mounted on the opposite leg of the frame and having other top and bottom horizontal bars of such length that when both gates are closed the outer ends of the said other top and bottom bars overlap the inner edge portion of the first gate; said second gate being adapted to close less than half the width of the chute; a stanchion gate pivoted adjacent its lower end on the second gate and adapted to be swung to vary the width of the opening between the first and second gates when closed; means for swinging said stanchion gate into closed position; releasable means for locking the stanchion gate in its swung position; releasable means on the second gate for locking the first and second gates in closed position; said stanchion gate having a vertical bar at its inner edge, the top of which slidably engages the top bar of the second gate; a horizontal rod journaled in spaced bearings on said top bar, the top bar and rod receiving the upper end of the vertical bar of the stanchion gate therebetween; a depending handle on said rod normally gravitationally engaging the face of the second gate to maintain the rod in one position of rotation; and said releasable means for locking the stanchion gate in its swung position comprising a series of ratchet teeth on the side of the rod adjacent the top bar when the rod is in normal position; and a fixed spring-biased detent on the top bar adapted to engage said ratchet teeth as the stanchion gate is closing to prevent opening of the stanchion gate until the handle is raised to rotate the rod to disengage the ratchet teeth from said detent.

2. In combination with an animal chute, a combined gate and stanchion; said gate comprising a frame having spaced legs disposed transversely of and bridging the sides of the chute; a first gate hingedly mounted on one leg of the frame and having top and bottom horizontal bars of such length that when the gate is swung into closed position transversely of the chute the outer ends of the bars will engage the opposite leg of the frame; said first gate being adapted to close less than half the width of the chute; a second gate hingedly mounted on the opposite leg of the frame and having other top and bottom horizontal bars of such length that when both gates are closed the outer ends of the said other top and bottom bars overlap the inner edge portion of the first gate; said second gate being adapted to close less than half the width of the chute; a stanchion gate pivoted adjacent its lower end on the second gate and adapted to be swung to vary the width of the opening between the first and second gates when closed; means for swinging said stanchion gate into closed position; releasable means for locking the stanchion gate in its swung position; releasable means on the second gate for locking the first and second gates in closed position; the top and bottom bars of the second gate lying within the area and plane of the top and bottom bars of the first gate; and said releasable means for locking the first gate in closed position comprising a vertical shaft journaled in bearings on the second gate adjacent the opposite leg of the frame and terminating short of the top and bottom bars of the first gate; angle clips on the ends of said shaft whose vertical flanges normally overlie the outer ends of the top and bottom bars of the first gate to normally prevent opening of said first gate in one position of rotation of said shaft; a handle on the upper end of said shaft for rotating the latter; means for yieldably maintaining the handle in position to prevent opening of the first gate, said handle being manually operable to rotate the shaft into unlocking position; and lugs on the outer ends of the top and bottom bars of the second gate engaging the rear faces of the top and bottom bars of the first gate to prevent opening of the second gate until the first gate has been opened.

3. In combination with an animal chute, a combined gate and stanchion; said gate comprising an inverted U-shaped frame disposed transversely of and bridging the sides of the chute; a first gate hingedly mounted on one leg of the frame and having top and bottom horizontal bars of such length that when the gate is swung into closed position normal to the axis of the chute, the outer ends of the bars will engage the opposite leg of the frame; a plate closing the area of the first gate from top to bottom and from said first leg of the frame to a vertical offset line disposed less than half the width of the chute; a second gate hingedly mounted on the opposite leg of the frame and having other top and bottom horizontal bars of such length that when both gates are closed the outer ends of the said other top and bottom bars overlap the inner edge portion of the plate of the first gate; a second plate closing the area of the second gate from top to bottom and from said opposite leg of the frame to an offset downwardly and inwardly extending line disposed less than half the width of the chute; a stanchion gate pivoted adjacent its lower end on the second gate and adapted to be swung to vary the width of the opening between the first and second plates; means for swinging said stanchion gate into closed position; releasable means for locking the stanchion gate in its swung position; and releasable means on the second gate for locking the first and second gates in closed position.

4. In a combination as set forth in claim 3, said means for swinging the stanchion gate comprising a flexible member having one end secured to the chute in rear of the gate and loosely following along the top of the chute at the side thereof at which the second gate is mounted; a pulley on the frame above the second gate through which the member extends; a second pulley on the top bar of the second gate adjacent the outer end thereof through which said member also extends; and the other end of the member being secured to the top of the stanchion gate whereby a pull on the member by an attendant in the chute in rear of the closed first and second gates will swing the stanchion gate inwardly of the chute to adjustably close the opening between the first and second plates.

5. In a combination as set forth in claim 3, said stanchion gate having a vertical bar at its inner edge the top of which slidably engages the top bar of the second gate; a horizontal rod journaled in spaced bearings on said top bar, the top bar and rod receiving the upper end of the vertical bar of the stanchion gate therebetween; a depending handle on said rod normally gravitationally engaging the face of the second gate to maintain the rod in one position of rotation; and said releasable means for locking the stanchion gate in its swung position comprising a series of ratchet teeth on the side of the rod adjacent the top bar when the rod is in normal position; and a fixed spring-biased detent on the top bar adapted to engage said ratchet teeth as the stanchion gate is closing to prevent opening of the stanchion gate until the handle is raised to rotate the rod to disengage the ratchet teeth from said detent.

6. In a combination as set forth in claim 3, the top and bottom bars of the second gate lying within the area and plane of the top and bottom bars of the first gate; and said releasable means for locking the first gate in closed position comprising a vertical shaft journaled in bearings on the second gate adjacent the opposite leg of the frame and terminating short of the top and bottom bars of the first gate; heads on the ends of said shaft having angle clips whose vertical flanges overlie the outer ends of the top and bottom bars of the first gate to normally prevent opening of said first gate in one position of rotation of said shaft; an L-shaped handle on the upper end of said shaft for rotating the latter; a spring for yieldably maintaining the handle in position to prevent opening of the first gate, said handle being manually operable to rotate the shaft into unlocking position; and lugs on the outer ends of the top and bottom bars of the second gate engaging the rear faces of the top and bottom bars of the first gate to prevent opening of the second gate until the first gate has been opened.

7. A combined gate and stanchion for animal chutes, comprising an inverted U-shaped frame adapted to be disposed transversely of and to bridge the sides of the chute; a first gate member hingedly mounted on one leg of the frame and having top and bottom horizontal bars of such length that when the gate is swung into closed position normal to the axis of the chute, the outer ends thereof will engage the opposite leg of the frame; said first gate member being adapted to close less than half the width of the frame; a second gate member hingedly mounted on the opposite leg of the frame and having other top and bottom horizontal bars of such length that when both gates are closed the outer ends of the said other top and bottom bars overlap the inner edge portion of the first gate; said second gate member being adapted to close less than the width of the frame; a stanchion gate member pivoted adjacent its lower end on the second gate member and adapted to be swung to vary the width of the opening between the first and second gates; means for swinging said stanchion gate into closed position; releasable means for locking the stanchion gate member in its swung position; releasable means on the second gate member for locking the first and second gate members in closed position; said stanchion gate having a vertical bar at its inner edge slidably engaging the top bar of the second gate member; a horizontal rod journaled in spaced bearings on said top bar, the top bar and rod receiving the upper end of the vertical bar of the stanchion gate therebetween; a depending handle on said rod normally gravitationally engaging the face of the second gate member to maintain the rod in one position of rotation; and said releasable means for locking the stanchion gate in its swung position comprising a series of ratchet teeth on the side of the rod adjacent the top bar when the rod is in normal position; and a fixed spring-biased detent on the top bar adapted to engage said ratchet teeth as the stanchion gate is closing to prevent opening of the stanchion gate until the handle is raised to rotate the rod to disengage the ratchet teeth from said detent.

8. A combined gate and stanchion for animal chutes, comprising an inverted U-shaped frame adapted to be disposed transversely of and to bridge the sides of the chute; a first gate member hingedly mounted on one leg of the frame and having top and bottom horizontal bars of such length that when the gate is swung into closed position normal to the axis of the chute, the outer ends thereof will engage the opposite leg of the frame; said first gate member being adapted to close less than half the width of the frame; a second gate member hingedly mounted on the opposite leg of the frame and having other top and bottom horizontal bars of such length that when both gates are closed the outer ends of the said other top and bottom bars overlap the inner edge portion of the first gate; said second gate member being adapted to close less than the width of the frame; a stanchion gate member pivoted adjacent its lower end on the second gate member and adapted to be swung to vary the width of the opening between the first and second gates; means for swinging said stanchion gate into closed position; releasable means for locking the stanchion gate member in its swung position; releasable means on the second gate member for locking the first and second gate members in closed position; the top and bottom bars of the second gate member lying within the area and plane of the top and bottom bars of the first gate member; and said releasable means for locking the first gate in closed position comprising a vertical shaft journaled in bearings on the second gate adjacent the opposite leg of the frame and terminating short of the top and bottom bars of the first gate; heads on the ends of said shaft having angle clips whose vertical flanges overlie the outer ends of the top and bottom bars of the first gate to normally prevent opening of said first gate in one position of rotation of said shaft; a handle on the upper end of said shaft for rotating the latter; means for yieldably maintaining the handle in position to prevent opening of the first gate, said handle being manually operable to unlock the said means; and lugs on the outer ends of the top and bottom bars of the second gate member engaging the rear faces of the top and bottom bars of the first gate member to prevent opening of the second gate until the first gate has been opened.

9. A combined gate and stanchion for animal chutes, comprising an inverted U-shaped frame adapted to be disposed transversely of and to bridge the sides of the chute; a first gate member hingedly mounted on one leg of the frame and having top and bottom horizontal bars of such length that when the gate is swung into closed position normal to the axis of the chute, the outer ends thereof will engage the opposite leg of the frame; a plate closing the area of the first gate member from top to bottom and from said first leg of the frame to a vertical offset line disposed less than half the width of the frame; a second gate member hingedly mounted on the opposite leg of the frame and having other top and bottom horizontal bars of such length that when both gates are closed the outer ends of the said other top and bottom bars overlap the inner edge portion of the plate of the first gate; a second plate closing the area of the second gate member from top to bottom and from said opposite leg of the frame to an offset downwardly and inwardly extending line disposed less than half the width of the frame; a stanchion gate member pivoted adjacent its lower end of the second gate member and adapted to be swung to vary the width of the opening between the first and second plates; means for swinging said stanchion gate into closed position, releasable means for locking the stanchion gate member in its swung position; and releasable means on the second gate member for locking the first and second gate members in closed position.

10. In a combination as set forth in claim 9, said means for swinging the stanchion gate comprising a flexible member having one end secured to the chute in rear of the gate and loosely following along the top of the chute at the side thereof at which the second gate is mounted; a pulley on the frame above the second gate through which the member extends; a second pulley on the top bar of the second gate adjacent the outer end thereof through which said member also extends; and the other end of the member being secured to the top of the stanchion gate whereby a pull on the member by an attendant in rear of the frame will swing the stanchion gate to adjustably close the opening between the first and second gate members.

11. In a combination as set forth in claim 9, said stanchion gate having a vertical bar at its inner edge slidably engaging the top bar of the second gate member; a horizontal rod journaled in spaced bearings on said top bar, the top bar and rod receiving the upper end of the vertical bar of the stanchion gate therebetween; a depending handle on said rod normally gravitationally engaging the face of the second gate to maintain the rod in one position of rotation; and said releasable means for locking the stanchion gate in its swung position comprising a series of ratchet teeth on the side of the rod adjacent the top bar when the rod is in normal position; and a fixed spring-biased detent on the top bar adapted to engage said ratchet teeth as the stanchion gate is closing and to prevent opening of the stanchion gate until the handle is raised to rotate the rod to disengage the ratchet teeth from said detent.

12. In a combination as set forth in claim 9, the top and bottom bars of the second gate lying within the area and plane of the top and bottom bars of the first gate member; and said releasable means for locking the first gate in closed position comprising a vertical shaft journaled in bearings on the second gate adjacent the opposite leg of the frame and terminating short of the top and bottom bars of the first gate; heads on the ends of said shaft having angle clips whose vertical flanges overlie the outer ends of the top and bottom bars of the first gate to normally prevent opening of said first gate in one position of rotation of said shaft; and L-shaped handle on the upper end of said shaft for rotating the latter; means for yieldably maintaining the handle in position to prevent opening of the first gate, said handle being manually operable to unlock the said means; and lugs on the outer ends of the top and bottom bars of the second gate member engaging the rear faces of the top and bottom bars of the first gate member to prevent opening of the second gate until the first gate has been opened.

References Cited in the file of this patent

UNITED STATES PATENTS

| | | |
|---|---|---|
| 2,508,549 | Stephenson | May 23, 1950 |
| 2,564,317 | Whitworth | Aug. 14, 1951 |
| 2,833,248 | Meyer et al. | May 6, 1958 |
| 2,969,770 | Collins | Jan. 31, 1961 |
| 3,043,268 | Sheriff | July 10, 1962 |
| 3,051,127 | Norbury | Aug. 28, 1962 |
| 3,099,249 | Newhouse | July 30, 1963 |